(No Model.)

R. WALSH.
GASKET PACKING.

No. 494,402. Patented Mar. 28, 1893.

WITNESSES:
C. R. Morgan
N. H. Edgerton

INVENTOR
Richard Walsh
BY
L. Lyd Wiegand
ATTORNEY.

UNITED STATES PATENT OFFICE.

RICHARD WALSH, OF PHILADELPHIA, PENNSYLVANIA.

GASKET-PACKING.

SPECIFICATION forming part of Letters Patent No. 494,402, dated March 28, 1893.

Application filed December 17, 1892. Serial No. 455,533. (No model.)

*To all whom it may concern:*

Be it known that I, RICHARD WALSH, a citizen of the United States, residing at Philadelphia, in the county of Philadelphia and State of Pennsylvania, have invented certain new and useful Improvements in Gasket-Packing for Manholes, Hand-Holes, and Steam, Hydraulic, and Pneumatic Service; and I do hereby declare the following to be a sufficiently full, clear, and exact description thereof as to enable others skilled in the art to make and use the said invention.

This invention relates to gaskets for forming or packing fluid tight joints such as are required in steam, hydraulic and pneumatic service, and has for its object the greater certainty of fluid tightness, better facility of closure, and the better capacity of such gaskets for repeated use.

To this end, this invention consists in a flat strip of ductile metal, having a dovetailed groove or grooves upon its broad sides, into these grooves are inserted dovetailed strips of india rubber, or other yielding packing material; such metallic strips being cut to proper lengths and bent into rings of dimensions and form, corresponding to the surfaces opposed in the joint, have the ends united, and are placed between the surfaces to be joined, and are compressed between such surfaces in the manner usual with ordinary packing gaskets.

Figure 1:
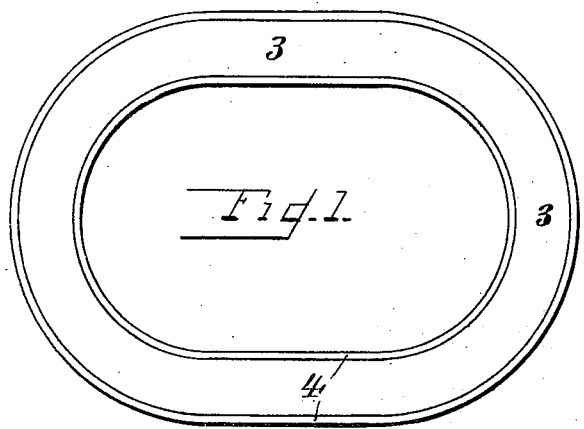
Figure 2:
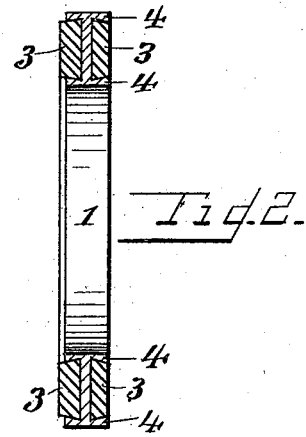
Figure 3:
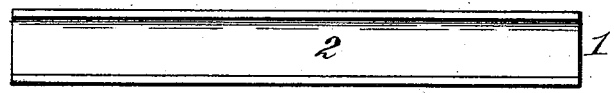
Figure 4:
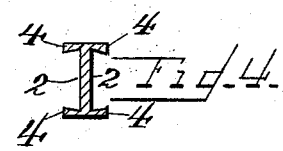
Figure 5:
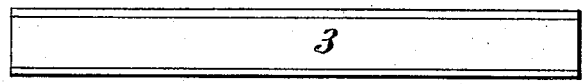
Figure 6:
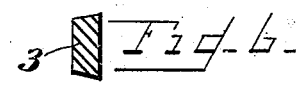
Figure 7:
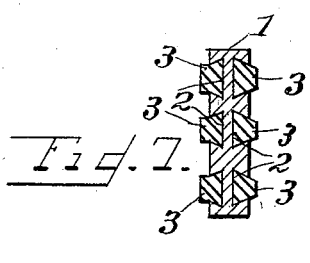
Figure 8:
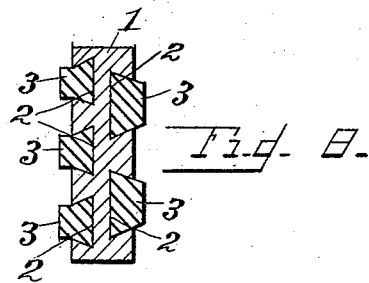

This invention is hereinafter fully described and is shown in the accompanying drawings, in which, Figure 1, shows a face view of a manhole or hand-hole gasket embodying this invention; Fig. 2, a transverse section thereof; Fig. 3, a face view of the metallic bar from which the gasket is prepared; Fig. 4, a transverse section thereof; Fig. 5, a face view of the india rubber packing strip which forms a part of the gasket; Fig. 6, a transverse section thereof. Figs. 7 and 8, show in section modifications of the packing.

Referring to the drawings, 1 represents a flat bar of ductile metal such as lead, having dovetailed grooves 2 upon each side. Into each dovetailed groove 2, is fitted a correspondingly shaped dovetailed fillet or strip 3, of india rubber. The strip 3, of india rubber may be flush with the flanges 4, of the groove 2, as shown at the right side of Fig. 2, or may project above them as shown in the left side of said figure, the latter construction appears in use to be preferable.

As shown in Figs. 7 and 8, a number of grooves 2, are made in each side of the metallic strips and each groove 2, is fitted with a strip 3, of india rubber.

To use this invention the packing strip is cut into proper lengths, and then the india rubber strip 3, removed, it is next bent into the desired form, and the ends of the metal bar 1, united by soldering; the india rubber strips 3, are replaced and the gasket is then ready for use, and is applied in the usual manner, and compressed until contact is enforced throughout both side surfaces with the parts of the joint.

I am aware that gasket packings formed of rings of rigid metal with retaining ridges of pyramidal section for protecting a soft packing located between them have been made also that piston packings having a rigid ring provided with inwardly curved flanges embracing soft packing strips have been made. Neither of these do I claim but, Having described my invention, what I claim is—

1. A flat rectangular bar of ductile metal having dovetailed grooves in the flat sides thereof, in combination with strips of india-rubber of corresponding dovetailed form inserted in said grooves, the whole being adapted to be formed into gasket packing rings substantially as set forth.

2. A gasket packing consisting of a flat ring of ductile metal having a rectangular cross-section with dovetailed grooves in the flat sides thereof in combination with fillets of india-rubber of corresponding dovetailed form inserted in said grooves substantially as set forth.

RICHARD WALSH.

Witnesses:
C. R. MORGAN,
H. R. PRINDLE.